Jan. 20, 1959     D. F. RYDER     2,869,838
AGITATING DEVICE
Filed April 9, 1956
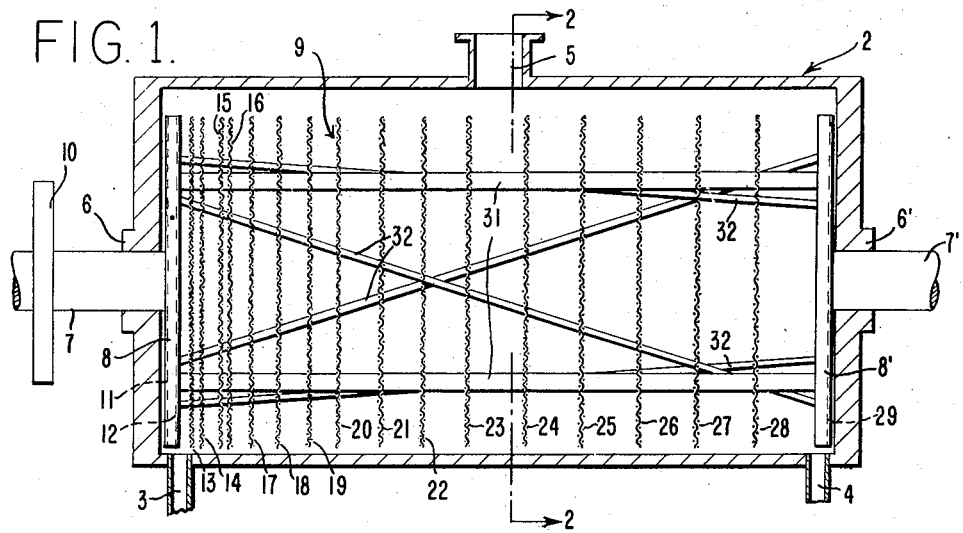
INVENTOR
DAVID F. RYDER
BY *Raymond E. Blomstedt*
ATTORNEY

United States Patent Office 2,869,838
Patented Jan. 20, 1959

2,869,838

AGITATING DEVICE

David F. Ryder, Wilmington, Del., assignor to E. I. du Pont de Nemours and Company, Wilmington, Del., a corporation of Delaware Application April 9, 1956, Serial No. 577,021

6 Claims. (Cl. 259—9)

This invention relates to agitation of liquids, concerning particularly mixing of material undergoing polymerization to highly viscous condition.

In preparation of fiber-forming polymers of high molecular weight, viscosity uniformity is essential to attainment of constancy in physical properties demanded by the highly competitive textile industry. Continuous processing has apparent advantages in decreased requirements of cost and time in comparison with conventional batch methods, but the benefits are illusory unless the output polymer is uniform. Contamination of the product with incompletely processed material is a frequent problem in operation with a single reaction vessel, and attempted elimination of extreme mixtures by baffling usually gives rise to regions where the formed polymer stagnates and degrades; on the other hand, use of multiple vessels, whether arranged in parallel or in succession, raises costs and, at least in the latter modification, reaction time as well. In preparation of condensation polymer, volatile by-products impose further requirements of magnifying the available surface sufficiently to facilitate their removal.

A primary object of the present invention is thorough agitation of liquid with rapid removal of volatile material therefrom. An object is continuous conversion of a liquid of low viscosity to one of high viscosity, with progressive removal of volatile material. Other objects of the present invention, together with means and methods for attaining the various objects, will be apparent from the following discussion and the accompanying diagrams.

Figure 1 is a longitudinal sectional elevation of apparatus of this invention. Figure 2 is a transverse sectional elevation taken at 2—2 of Figure 1. Figure 3 is a perspective view of an element of the apparatus of Figures 1 and 2.

In general, the objects of the present invention are accomplished by passing a liquid capable of evolving volatile material through a generally cylindrical vessel oriented with its longitudinal axis sufficiently nearly horizontal to prevent the body of the liquid when at steady state from filling the vessel transversely anywhere along its entire length, agitating the liquid during its passage through the vessel and thereby drawing portions of the liquid from the body of the liquid at intervals throughout the vessel into the form of successive thin layers oriented transversely with respect to the axis and spaced relatively closely to one another near the entrance and relatively widely apart near the exit of the vessel, and withdrawing volatile material therefrom. The invention comprehends, as apparatus for performing this process, a generally cylindrical vessel having an inlet for liquid near one end and an outlet for liquid near the opposite end thereof and an intermediate vent for vapor and, mounted inside along an axis substantially parallel to the cylindrical axis, a multiplicity of screens adapted to rotate and thereby agitate liquid in the vessel, the screens nearest the inlet end of the vessel being arranged in pairs and located with the spacing between the screens of any pair exceeded by the spacing between either screen of the pair and the nearest screen outside the pair. In particular, this invention contemplates agitator means having a plurality of circular screens spaced along a common axis, including a plurality of pairs of screens at one end separated from one another a distance less than the spacing of adjacent screens, both the spacing and the mesh of the screens being least at one end of the axis and greatest at the other end and varying unidirectionally stepwise in between.

Figure 1 shows in longitudinal sectional elevation agitation apparatus useful according to the present invention. Vessel 2 has inlet 3 and outlet 4 located on the underside near opposite ends of the vessel to receive and discharge the liquid, and it also has vent 5 for vapor at the top about halfway between the two ends. Journals 6 and 6' in the opposite ends of the vessel rotatably mount shafts 7 and 7' extending axially from spoked end wheels 8 and 8' of agitator 9. Pulley 10 is mounted fixedly on end shaft 7 outside the vessel. The agitator includes mutually parallel screens 11 to 29, inclusive spaced from one another concentric with and perpendicular to the agitator axis, which is slightly below the axis of the enclosing vessel and parallel thereto. Screens 11 and 12 are located inside and in contact with end wheel 8, and screen 29 similarly inside end wheel 8', at opposite ends of the agitator. The intervening screens are supported on four evenly spaced compression rods 31 (only two visible) extending parallel to the agitator axis from the peripheral edge of one end wheel to the other, while four tension rods 32 extending at an angle to the axis also join the end wheels and pass through the screens.

As is apparent in Figure 2, which shows the apparatus of Figure 1 in transverse section about midway between the ends, the axis of the agitator is displaced toward the 7 o'clock position from the axis of the vessel, putting the closest approach of the agitator to the cylindrical wall at the lower left. The normal direction of rotation of the agitator is indicated by an arrow. Screen 24 is visible with the various compression and tension rods passing through it, and the liquid outlet and vapor vent also show.

Figure 3 illustrates the agitator in greater detail viewed in perspective from a vantage point in the plane of end wheel 8. This shows succeeding screens at increasing angles, clearly illustrating the increases in mesh size toward the far end. The screen spacing is most evident perhaps at the near end, showing the arrangement into pairs of screens 11 and 12, 13 and 14, and 15 and 16, the spacing between the pairs exceeding the separation of screens within each pair; that the subsequent screens are located singly, rather than in pairs, and more widely spaced from one another is also apparent.

Operation of this apparatus, which is especially adapted to function as a reactor for condensation polymerization, is readily understood. Liquid of comparatively low viscosity is forced by suitable means into the inlet of the vessel and passes to the other end and out the outlet, the flow being effected through gravity alone, during rotation of the agitator, despite increase in viscosity of the liquid in the meantime. The axis of the vessel usually is substantially horizontal, although it may be inclined somewhat to influence the flow, if desired. Motive power for the agitator is supplied to the external pulley by conventional means from any suitable source.

As the agitator turns, each pair of screens near the inlet picks up a layer of liquid to fill the interval between the screens in the pair more or less completely, forming a layer of usually rather bubbly or frothy consistency displaced transversely (with respect to the axis) from the body of the liquid. Continual interchange of liquid occurs between the body and the displaced layers thereof. The spacing between pairs of screens exceeds the separation of individual screens in each pair sufficiently to prevent bridging of the liquid between adjacent pairs. The great increase in surface area as the liquid is distributed on and between the screens permits ready emission of vapor, which is withdrawn through the vent, to lower pressure if necessary.

As the liquid increases in viscosity upon removal of vapor, it encounters screens with wider and wider spacing and greater mesh size so that each of the more widely spaced screens picks up a single layer of clinging liquid, the increased spacing preventing bridging between the individual screens. The porosity of the screens permits the liquid to flow gradually toward the opposite end of the vessel. By-passing is minimized by location of the closest approach of the agitator to the vessel wall at about the bisector of the liquid mass, which naturally is displaced bodily somewhat in the direction of rotation to a steady-state position that depends upon the processing conditions. Removal of the product may be facilitated by use of an exhaust pump in the outlet line.

In practice, the dimensions of the vessel and the agitator, the screen spacing, mesh size, and agitator speed will depend upon the liquid being processed. In processing of liquid of eventual viscosity exceeding about 1000 poises, it has proved desirable to rotate the agitator at no more than about ten complete turns per minute, inasmuch as more rapid rotation imposes excessive power requirements; rotation at less than several turns per minute is relatively ineffective at viscosities under about 100 poises. The flow of liquid and inclination of the vessel should be maintained so that at steady state the vessel is not so full that the body of the liquid extends transversely throughout the vessel anywhere along its length but preferably so that the exit end is about half full. The screens throughout should be arranged and dimensioned to pick up separate layers of liquid, carrying them up and out of the body of the liquid and all or part of the way about the axis, to provide greatly increased liquid surface and maintain continual agitation and interchange between the layers and the body of the liquid.

Unless and until the liquid being processed exceeds a viscosity of about 100 poises, location of screens in pairs is highly desirable; above about 200 poises single screens are preferable. Screen spacing at upwards of one inch is appropriate at the intermediate viscosities, with wider spacing at higher and closer spacing at lower viscosities. Where the screens are arranged in pairs at the lower viscosities, the separation of screens in each pair usually is on the order of tenths of an inch, while the spacing between adjacent pairs is several times that screen separation. In general, the size of the openings in the screens should approximate the screen spacing, being on the order of inches at high viscosities and fractions of an inch at low viscosities.

The total number of screens, like the spacing of the screens, depends upon the characteristics of the liquid being processed. Where a pronounced increase in viscosity occurs in the liquid, it usually is helpful to employ more screens than necessary in the absence of such a change; of course, where a chemical reaction occurs during the processing the number of screens will depend also upon the speed of reaction. Obviously, the total length of the enclosing vessel depends upon both the number and the spacing of the screens.

The cagelike construction of the illustrated agitator, in which strutlike rods arranged away from the axis replace the customary central axle of conventional agitators, is advantageous in reducing stagnation. Minimum clearance between agitator and wall of the enclosing vessel at or near the bottom should be on the order of the minimum screen spacing; clearance at the top is not critical at conservative declination of the vessel axis and ordinary agitator speeds, usually approximating the maximum screen spacing. The diameters of both agitator and vessel may vary with distance along the axis, if desired, so as to accommodate changes in bulk of liquid or to influence the flow. The vessel may be fitted with a perforated false ceiling communicating with the vent to facilitate removal of vapor.

An actual demonstration of the utility of the present invention employed an agitator about one foot in diameter and about two feet long mounted thirty degrees off center below the axis of a slightly larger surrounding vessel (26 inches long between liquid inlet and outlet at opposite ends thereof) with minimum clearance of $1/16$ inch and maximum clearance of about an inch between agitator and the vessel wall. Spacing and mesh of the screens are listed in the following table.

Table

| Screen Number (Ref. char. less 10) | Mesh (Openings per inch) | Distance from Preceding Screen (Inches) |
|---|---|---|
| 1 | 3 | 0 |
| 2 | 3 | 1/4 |
| 3 | 3 | 3/4 |
| 4 | 3 | 1/4 |
| 5 | 3 | 1/4 |
| 6 | 3 | 1/4 |
| 7 | 3 | 3/4 |
| 8 | 3 | 1 |
| 9 | 3 | 1 |
| 10 | 3 | 1 |
| 11 | 3 | 15/16 |
| 12 | 2 | 1 1/2 |
| 13 | 2 | 1 1/2 |
| 14 | 2 | 1 7/8 |
| 15 | 2 | 2 |
| 16 | 1 | 2 |
| 17 | 1 | 2 |
| 18 | 1 | 2 1/4 |
| 19 | 1 | 2 1/2 |

The material introduced into the vessel was a condensate of low viscosity prepared by heating 100 parts ethylene glycol with 100 parts dimethyl terephthalate in the presence of a catalyst comprising 0.042 part manganese acetate and 0.03 part antimony trioxide, methanol being removed until no more was evolved; the temperature was then increased to 240° C., the pressure reduced to about 40 mm. of mercury, and glycol distilled over until the remaining liquid had a relative viscosity of 6.

The interior of the vessel was evacuated to a pressure equivalent to 1½ mm. of mercury by evacuation through the vent, and the agitator was rotated at a constant speed of 5 R. P. M. The starting liquid was pumped at constant rate into the inlet of the horizontal vessel to provide a steady state of liquid passage through the vessel and out the outlet without at any time filling the vessel. At a prevailing temperature of 270° C. the throughput time was slightly over one hour, and the throughput rate was 30 pounds per hour. The liquid entered with absolute viscosity of about 7 poises and relative viscosity of 6 and left with viscosity increased to about 3000 poises (relative viscosity of 25). Absolute viscosity was checked by the falling-ball method, and a differential pressure indicator of viscosity at the outlet permitted control of the product viscosity by slight changing of the pressure in the vessel. Relative viscosity was determined by the capillary method, being the quotient obtained by dividing the efflux time for a solution of 11 grams of polymer in 100 cc. of a solvent mixture of 7 parts trichlorophenol and 10 parts phenol (by weight) by the efflux time for the solvent alone.

The product was homogeneous and colorless, being entirely suitable for extrusion into filaments. A period of twenty-four hours of continuous sampling (once every 15 minutes) of filaments melt-spun in conventional manner from this resulting polymer revealed remarkable consistency in the physical properties of the filaments.

Both color and carboxyl content were steady, and the relative viscosity was 24.1 with a standard deviation of only 0.41.

The apparatus of the present invention is readily adapted to the processing of other linear condensation polymers, such as the preparation of polyhexamethyleneadipamide from a low-molecular-weight condensate of hexamethylene diamine and adipic acid. The invention also can be employed in the evaporation of dilute solutions of viscous liquids to remove part or all of the solvent from the dissolved liquid. If desired, the vessel may be jacketed and supplied with vapor to keep the treated liquid at desired temperature by removing or supplying heat.

The claimed invention:

1. Apparatus comprising a generally cylindrical vessel having an inlet for liquid near one end and an outlet for liquid near the opposite end thereof and an intermediate vent for vapor and, mounted inside along an axis substantially parallel to the cylindrical axis, a multiplicity of screens adapted to rotate and thereby agitate liquid in the vessel, the screens nearest the inlet end of the vessel being arranged in pairs and located with the spacing between the screens of any pair exceeded by the spacing between either screen of the pair and the nearest screen outside the pair.

2. The apparatus of claim 1 in which the spacing between adjacent pairs of screens nearest the inlet end of the vessel is less than the spacing between the screens nearest the opposite end of the vessel, and each successive spacing proceeding from the inlet end to the opposite end of the vessel, is at least equal to the immediately preceding spacing.

3. The apparatus of claim 1 in which the mesh size of the screens nearest the inlet end of the vessel is smaller than the mesh size of the screens nearest the opposite end of the vessel.

4. The apparatus of claim 1 in which the spacing between screens and the mesh of the screens both exhibit at least two size increases, proceeding from the inlet end to the opposite end of the vessel.

5. In apparatus for agitation of liquids, the improvement comprising, as agitator means, a plurality of circular screens spaced along a common axis, including a plurality of pairs of screens at one end separated from one another a distance less than the spacing therefrom of adjacent screens, both the spacing and the mesh size of the screens being least at one end of the axis and greatest at the other end and varying unidirectionally stepwise in between.

6. The apparatus improvement of claim 5 in which the screens are supported by a plurality of compression members and a plurality of tension members spaced from one another and located away from the axis.

References Cited in the file of this patent

UNITED STATES PATENTS

| | | |
|---|---|---|
| 583,751 | James | June 1, 1897 |
| 2,118,616 | McConnaughay | May 24, 1938 |
| 2,178,500 | Singer | Oct. 31, 1939 |
| 2,488,884 | Van Dijck | Nov. 22, 1949 |
| 2,518,283 | Cassassa | Aug. 8, 1950 |
| 2,534,028 | Izard | Dec. 12, 1950 |
| 2,774,577 | Anderson et al. | Dec. 18, 1956 |